United States Patent
Michmerhuizen et al.

(10) Patent No.: US 9,619,718 B2
(45) Date of Patent: Apr. 11, 2017

(54) IN-VEHICLE CAMERA AND ALERT SYSTEMS

(71) Applicant: Johnson Controls Technology Company, Holland, MI (US)

(72) Inventors: Mark Michmerhuizen, Holland, MI (US); Troy Mulder, Zeeland, MI (US)

(*) Notice: Subject to any disclaimer, the term of this patent is extended or adjusted under 35 U.S.C. 154(b) by 324 days.

(21) Appl. No.: 14/132,189

(22) Filed: Dec. 18, 2013

(65) Prior Publication Data

US 2015/0169968 A1 Jun. 18, 2015

(51) Int. Cl.
| | | |
|---|---|---|
| G06K 9/00 | (2006.01) | |
| H04L 29/08 | (2006.01) | |
| B60R 1/00 | (2006.01) | |
| H04N 7/18 | (2006.01) | |
| G08B 13/196 | (2006.01) | |

(52) U.S. Cl.
CPC ............ *G06K 9/00805* (2013.01); *B60R 1/00* (2013.01); *G08B 13/19647* (2013.01); *G08B 13/19695* (2013.01); *H04L 67/12* (2013.01); *H04N 7/183* (2013.01)

(58) Field of Classification Search
None
See application file for complete search history.

(56) References Cited

U.S. PATENT DOCUMENTS

| 5,783,989 A | 7/1998 | Issa et al. |
|---|---|---|
| 2007/0182526 A1 | 8/2007 | Horii |
| 2010/0097466 A1* | 4/2010 | Kondo ............... G05B 15/02 348/143 |
| 2013/0295912 A1* | 11/2013 | Chen ................. H04W 4/00 455/420 |
| 2015/0232065 A1* | 8/2015 | Ricci ................. B60R 25/01 701/36 |

FOREIGN PATENT DOCUMENTS

| JP | 2011-090645 A | 5/2011 |
|---|---|---|
| JP | 2012-242991 A | 12/2012 |
| KR | 10-2004-01047754 A | 12/2004 |
| WO | WO-2012/058062 A1 | 5/2012 |

OTHER PUBLICATIONS

International Search Report and Written Opinion of the International Searching Authority dated Feb. 27, 2015, 9 pages.
International Preliminary Report on Patentability and Transmittal received in corresponding International Application No. PCT/US2014/070852 dated Jun. 30, 2016, 6 pages.

* cited by examiner

*Primary Examiner* — Sath V Perungavoor
*Assistant Examiner* — Janese Duley
(74) *Attorney, Agent, or Firm* — Foley & Lardner LLP

(57) ABSTRACT

A vehicle may include an object detection system and a control system. The object detection system may be configured to detect a presence of an object near the vehicle. In some implementations, the object detection system may include a sensor module and/or a camera system. The control system may be communicatively coupled to the object detection system and may be configured to determine an initial state of an area near the vehicle using the object detection system. The control system may be configured to activate a response if the object detection system detects the presence of an object near the vehicle based, at least in part, on the determined initial state. In some implementations, the response may include an activation of the camera system.

20 Claims, 11 Drawing Sheets

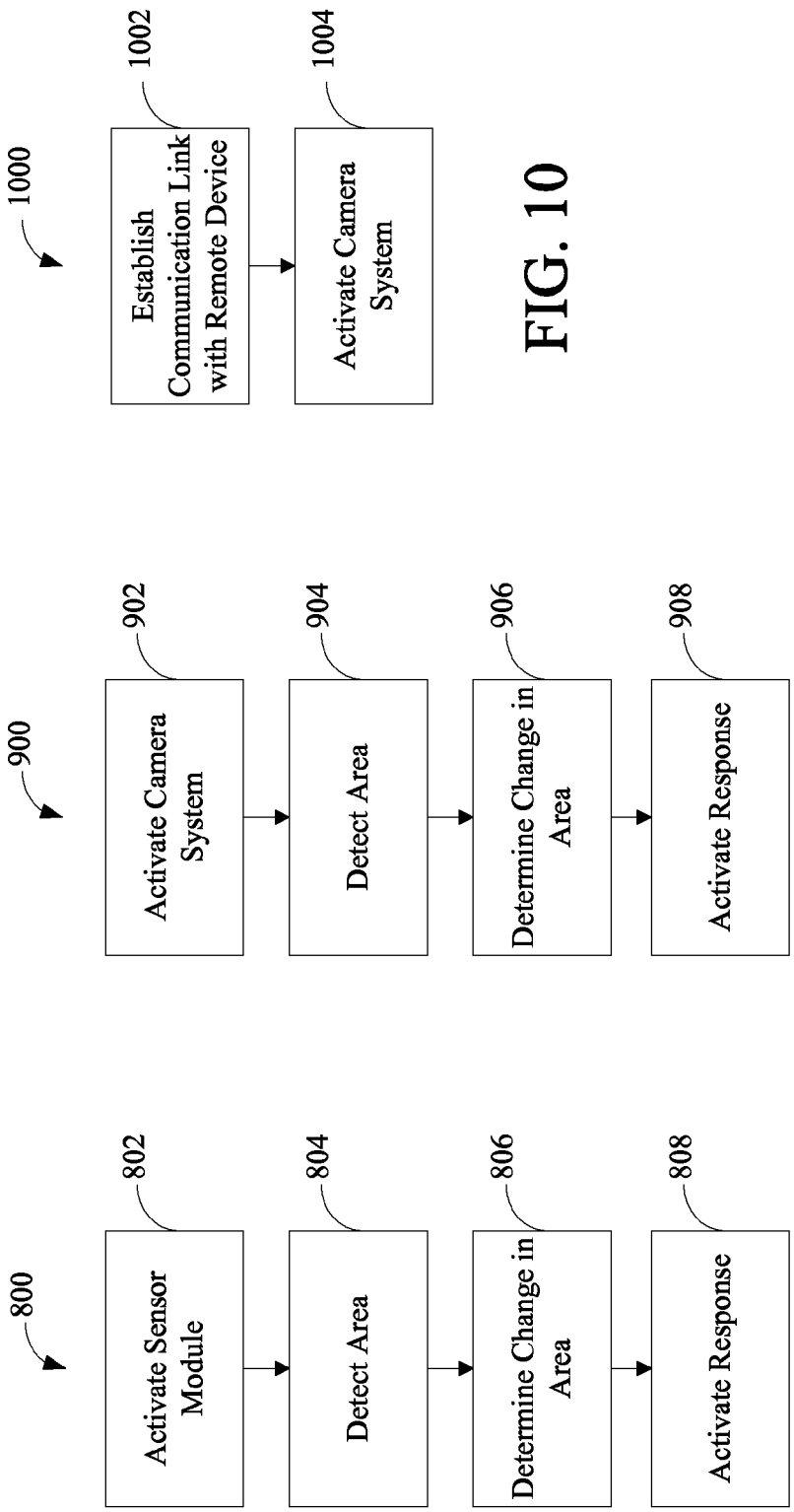

IN-VEHICLE CAMERA AND ALERT SYSTEMS

FIELD

The present disclosure relates generally to the field of vehicle electronics. The present disclosure relates more particularly to an object detection system for a vehicle. The present disclosure relates more particularly still to an object detection system for a vehicle having a sensor module and/or a camera system.

BACKGROUND

Some conventional vehicle systems may include rear-facing cameras for assisting a driver in backing a vehicle, such as during a reverse maneuver for backing up or parking the vehicle. Such camera systems are typically only activated upon a driver shifting into reverse. In other systems, cameras have been used to supplement or replace side mirrors of a vehicle. Such camera systems display the output from the camera or cameras on a monitor while the driver of the vehicle is driving. These camera systems are typically only activated during the usage of the vehicle and remain inactive when the vehicle is not in use. Moreover, such systems typically actively display the output from the camera or cameras and do not store video data. Such back-up camera systems may include object detection features, but such features are typically only activated when the vehicle is shifted into reverse and typically only detect the presence of an object in real-time without reference to a prior state. Such systems cannot distinguish between an object that was previously behind the vehicle and a new object behind the vehicle.

In some conventional alarm systems for vehicles, an alarm may be triggered upon the occurrence of an event, such as attempt to pick a lock, a breaking of a window, or a physical disturbance to the vehicle. Such systems may cause an audible alarm to be emitted by the vehicle, one or more visual indicators to be activated by the vehicle, and/or a notification of the alarm status to be transmitted to a driver, such as to a keyfob in possession of the driver. However, such alarm systems typically provide limited information to a driver and merely notify the driver of an alarm causing event at the time the event occurs.

An improved object detection system for a vehicle is needed to remedy one or more of the foregoing deficiencies of the conventional systems.

SUMMARY

One implementation relates to a system for a vehicle that includes an object detection system associated with the vehicle. The object detection system may be configured to detect a presence of an object near the vehicle when the vehicle is not started. The system also includes a control system communicatively coupled to the object detection system. The control system may be configured to determine an initial state of an area near the vehicle using the object detection system and to activate a response if the object detection system detects the presence of an object near the vehicle based, at least in part, on the determined initial state.

Another implementation relates to a method for activating a response based on a detection of an object near a vehicle. The method includes determining a first state of an area near the vehicle at a first time using an object detection system. The method also includes determining a second state of the area near the vehicle at a second time using the object detection system, wherein the second time is after the first time. The method further includes determining a difference between the second state and the first state. The method still further includes activating a response based, at least in part, on the determined difference.

Yet another implementation relates to a system for a vehicle that includes an object detection system associated with the vehicle. The object detection system may include a sensor module configured to detect a presence of an object near the vehicle and a camera system. The system also includes a control system communicatively coupled to the sensor module and the camera system. The control system may be configured to determine an initial state of an area near the vehicle using the sensor module and to activate the camera system if the sensor module detects the presence of an object near the vehicle based, at least in part, on the determined initial state.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

FIG. 8 illustrates a process for activating a sensor module using the control system and activating a response when a change in an area near a vehicle is detected;

FIG. 9 illustrates a process for activating a camera system using the control system and activating a response when a change in an area near a vehicle is detected;

FIG. 10 illustrates a process for establishing a communications link with a remote device and activating a camera system.

Figure 1:
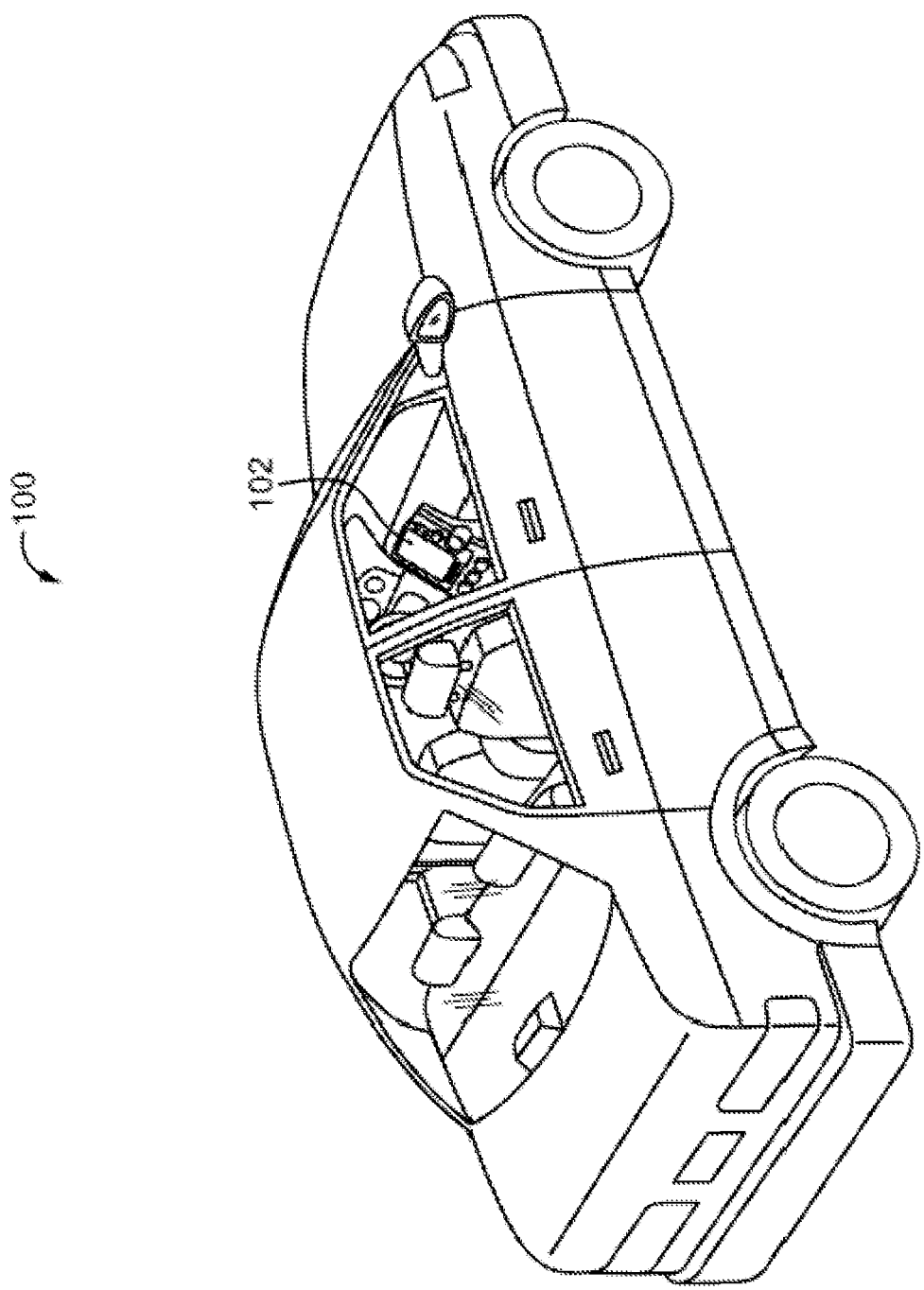
FIG. 1 is a drawing of a vehicle equipped with an integrated control system.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Following below are more detailed descriptions of various concepts related to, and implementations of, methods, apparatuses, and systems for an in-vehicle object detection system. The systems and methods described herein may be used to detect objects near a vehicle and activate a response, such as activating a camera system or providing an indication to a user of the vehicle. The systems and methods described herein may be used to detect the presence of a person, such as a potential perpetrator of a crime, that may be hiding behind or near the vehicle and who may not be detectable by the user of the vehicle, for example. A user returning to their vehicle in a parking garage may not detect the person and the systems and methods described herein may be capable of providing a notification to the user of the presence of the person near the vehicle, such as via a notification provided through a smartphone application, a text message, a phone call, visual and/or audible indications from the vehicle or otherwise. Such a notification to the user may allow the user to approach the vehicle with caution and/or seek the assistance of law enforcement authorities based on the possible threat.

In some implementations, a sensor module, such as a proximity sensor or radar, may be used to detect an initial state of an area near the vehicle or otherwise calibrate the system to detect changes in the area near the vehicle. When a user of the vehicle parks or turns off the vehicle, a control system may activate a sensor module to detect the area near the vehicle using the sensor module, such as near the front and/or rear bumpers, a side of the vehicle, 360 degrees around the vehicle, etc. In one example, the sensor module may detect the initial state of the area as a two foot space from the front bumper to a wall. If an object, such as a person, a vehicle, etc., enters the area, then the sensor module may detect the change. The control system of the vehicle may trigger an alarm, activate a camera system, output a notification to the owner of the vehicle, and/or communicate with a third-party system or service based on the detected change. In some instances, the response of the control system may be immediate or may occur at a later time, such as when the user of the vehicle is returning to the vehicle, when the vehicle is unlocked, etc.

In some implementations, a camera system may be used with the vehicle. The camera system may include a camera integrated into the vehicle or may include a detachable or otherwise removable camera. The camera of the camera system may include a back-up view camera mounted near the rear of the vehicle, a front view camera, a rotating camera, a fisheye camera, etc. In some implementations, the camera system may be used in lieu of the sensor module and may be configured to optically detect changes near the vehicle. In other implementations, the camera system may be used in addition to the sensor module described herein. For example, the camera system and control system described herein may be used to provide the user of the vehicle with an image of an object detected by the sensor module when the user is returning to the vehicle. In other instances, the control system may transmit video data from the camera system to a smartphone of the user when the object is detected. In still other instances, the control system may record the video data or image data from the camera system to be stored in a storage device such that a user of the vehicle may view the video data and/or image data later.

Figure 2:
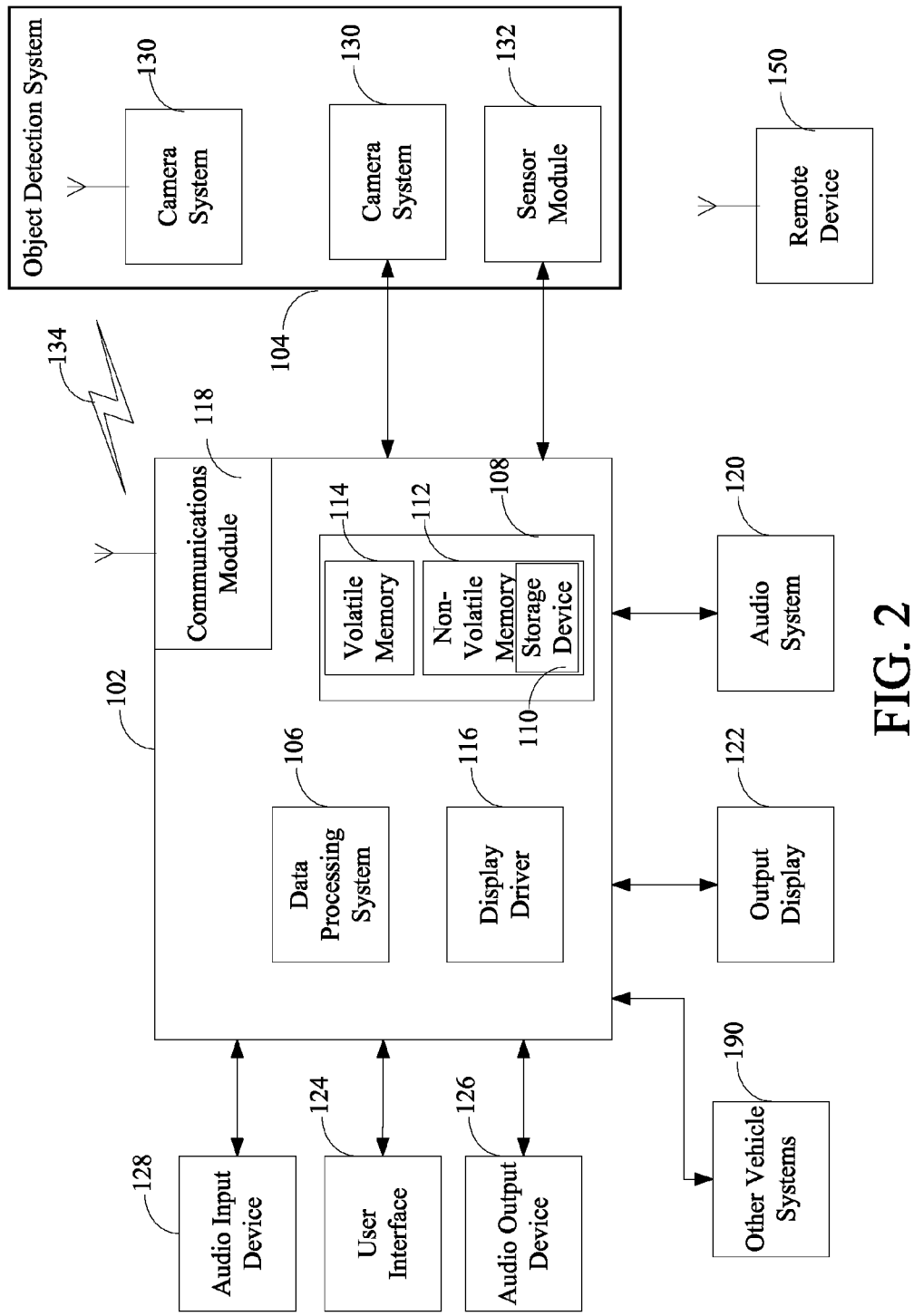
FIG. 2 is a block diagram of an integrated control system for controlling a vehicle's audio system, telephony system, heating, ventilation, and air conditioning system (HVAC), and/or an object detection system.

With reference to FIGS. 1 and 2, an example vehicle 100 includes a control system 102 within the vehicle 100. A vehicle 100 may include a number of subsystems for user convenience and entertainment. The control system 102 is shown as a part of vehicle 100, though in some implementations the control system 102 may be separate from the vehicle 100 (e.g., a detachable or portable control system). The vehicle 100 generally includes a heating, ventilation, and air-conditioning (HVAC) system, a sound system, and the in-vehicle control system 102 (e.g., media system, navigational system, entertainment system, display system, communications systems, etc.). The HVAC system, sound system, display systems, and communications systems may be coupled to the in-vehicle control system 102, which is capable of controlling and/or monitoring a variety of systems, automatically or by a manual user command. It is noted that in various implementations, the vehicle 100, the HVAC system, the sound system, and other vehicle systems may be of any past, present, or future design capable of interacting with the in-vehicle control system 102.

FIG. 2 depicts a block diagram of the control system 102 for controlling one or more aspects of the vehicle 100. The control system 102 is communicatively coupled to several systems, such as an object detection system 104, an audio system 120, an output display 122, a user interface 124, an audio output device 126, and/or an audio input device 128. The control system 102 is communicatively coupled to the audio system 120, the output display 122, the user interface 124, the audio output device 126, and/or the audio input device 128. The audio system 120 may include may include, for example, a radio, an amplifier and at least one speaker configured to provide audio signals to one or more vehicle occupants. The speakers (not shown) are configured to receive audio output data from control system 102 and/or other systems, including remote systems 150 via communications module 118. In some implementations, the audio output data may include text-to-speech data. The speakers may be a part of the vehicle audio system 120 or may be a dedicated speaker or speakers, such as audio output device 126, serving only the control system 102.

The control system 102 is also communicatively coupled to an output display 122. The output display 122 may be a touch-screen display, while in other implementations, may be any other non-touch sensitive display. In still other exemplary embodiments, output display 122 may be of any technology (e.g., LCD, DLP, plasma, CRT), configuration (e.g., portrait or landscape), or shape (e.g., polygonal, curved, curvilinear). The output display 122 may be a manufacturer installed output display, an aftermarket output display, or an output display from any source. The output display 122 may be an embedded display (e.g., a display embedded in the control system or other vehicle systems, parts or structures), a standalone display (e.g., a portable display, a display mounted on a movable arm), or a display having any other configuration.

The control system 102 is also communicatively coupled to a user interface 124 and/or an audio input device 128, such as a microphone. In some implementations, the user interface 124 may be integrated with the output display 122, such as a touch-screen display. The user interface 124 may be used to receive input commands from a vehicle occupant via, for example, pushbuttons, switches, a keypad, a touch-screen display, etc. Alternatively, input commands to the control system 102 may include a set of audio signals from a vehicle occupant. For example, a vehicle occupant may speak directly into the audio input device 128 to provide input commands to the control system 102. The audio input device 128 may include one or more microphones configured to receive an oral command from a vehicle occupant. The oral command may be any word or phrase that the occupant may speak, utter, or otherwise provide to cause the control system or another system to perform a function. A speech recognition system (not shown) in the control system 102 may be used to process various data signals, such as audio signals (e.g., oral input commands) received via the audio input device 128 and to recognize words or phrases in the oral command. Voice recognition technologies known in the art may be implemented in the speech recognition system. For example, the speech recognition system may include any speech recognition software or engine such as IBM Embedded ViaVoice®, manufactured by International Business Machines Corporation.

In some implementations, the user interface 124 may include an interface to allow an occupant of the vehicle 100 to modify one or more settings associated with the object detection system 104, described in greater detail herein. For example, such settings may include modifying a sensitivity of the object detection system 104 (e.g., how large of an object will trigger a response), a shadow setting (e.g., to identify and/or disregard shadows), a notification setting (e.g., whether to activate the lights of the vehicle, send a text message to a remote device, notify a third-party system, etc.), a time duration (e.g., how long to record video or a series of images), and/or other suitable settings.

The control system 102 of the vehicle 100 may be communicatively coupled to other vehicle systems 190 (e.g., an alarm system, a lighting system, etc.) and may further include communications features (e.g., Bluetooth phone connectivity, navigation communication systems, etc.), user comfort and convenience features, safety features, entertainment features such as radio, or other user interfacing features.

The control system 102 includes a data processing system 106 for processing commands and operations for the control system 102. The data processing system 106 may comprise one or more analog and/or digital electrical or electronic components, and may include a microprocessor, a microcontroller, an application-specific integrated circuit (ASIC), a field programmable gate array (FPGA), programmable logic and/or other analog and/or digital circuit elements configured to perform various input/output, control, analysis and other functions described herein.

The control system 102 may also include computer readable storage mediums 108, such as a storage device 110, non-volatile memory 112, and/or volatile memory 114. The computer readable storage mediums 108 may include one or more devices (e.g., RAM, ROM, Flash memory, hard disk storage, etc.) for storing data and/or computer code for completing and/or facilitating the various processes, layers, and modules described in the present disclosure. The computer readable storage mediums 108 may include database components, object code components, script components, or any other type of information structure for supporting the various activities and information structures described in the present disclosure. According to an implementation, the computer readable storage mediums 108 are communicably coupled to the data processing system 106 and include computer code (e.g., via the modules stored in memory) for executing (e.g., by the data processing system 106) one or more processes described herein. The storage device 110 may also store other computer-readable data, such as setting data, video data, image data, etc.

The control system 102 includes a communications module 118 that enables two-way communication with remote devices 150, remote systems, and/or with other systems of the vehicle 100, such as a wireless camera system 130. The communications module 118 may be configured as a communication circuit including analog and/or digital components, such that the communications module 118 is capable of transmitting and receiving short-range radio frequency ("RF") signals in any of a variety of data transmission formats, such as a Bluetooth communications protocol, an IEEE 802.11 communications protocol or other personal area network wireless communications protocols or data formats.

The communications module 118 may further be configured to include a cellular circuit such that the communications module 118 can also exchange voice and data signals with remote devices using any number or combination of communication standards (e.g., GSM, CDMA, TDNM, WCDMA, OFDM, GPRS, EV-DO, WiFi, WiMAX, S02.xx, UWB, LTE, satellite, etc). The techniques described herein can be used for various wireless communication networks, such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. A CDMA network can implement a radio technology such as Universal Terrestrial Radio Access (UTRA), cdma2000, etc. UTRA includes Wideband-CDMA (W-CDMA) and Low Chip Rate (LCR). CDMA2000 covers IS-2000, IS-95, and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2).

The communications module 118 may also include wired communications features, such as USB ports, serial ports, IEEE 1394 ports, optical ports, parallel ports, and/or any other suitable wired communication port.

The control system 102 is also in communication with an object detection system 104 of the vehicle 100. In the example shown in FIG. 2, the object detection system 104 includes a camera system 130 and a sensor module 132. The camera system 130 may be physically wired and communicatively coupled to the control system 102 and/or the camera system 130 may be wirelessly in communication with the control system 102, such as via the communications module 118, to send and receive transmissions 134 of data. The in-vehicle control system 102 may establish a wired communication link with the camera system 130 using USB technology, IEEE 1394 technology, optical technology, other serial or parallel port technology, or any other suitable wired link. The communications module 118 may establish a wireless communication link 134 with the camera system 130 using a Bluetooth communication protocol, an IEEE 802.11 protocol, an IEEE 802.16 protocol, a cellular signal, a Shared Wireless Access Protocol-Cord Access (SWAP-CA) protocol, a wireless USB protocol, or any other suitable wireless technology. The communications module 118 may receive one or more data files from the camera system 130, such as video data files, image data files, etc.

The camera system 130 may include one or more cameras for capturing videos and/or images. For example, the camera of the camera system 130 may be a pin camera mounted in a bumper of the vehicle 100, near a tail light of the vehicle 100, in a rear hatch of the vehicle 100, in a headrest of a seat, in a rearview mirror, extending from a rearview mirror, in an A pillar, in a B pillar, in a C pillar, etc. In some implementations, the camera of the camera system 130 may be an infrared camera. The camera may be fixed, such as a forward facing camera, a rearward facing camera, a camera facing a driver's seat, a fisheye camera, etc. In other implementations, the camera may be moveable or rotatable relative to the vehicle 100, such as a rotatable camera extending downwardly from the rearview mirror. Such a rotatable camera may permit a 360 degree view of the surroundings of the vehicle 100 (e.g., by rotating the camera relative to the vehicle 100).

The object detection system 104 also includes one or more sensor modules 132. The sensor modules 132 may be physically wired and communicatively coupled to the control system 102 and/or to the camera system 130. In other implementations, the sensor modules 132 may be wirelessly in communication with the control system 102 and or the camera system 130, such as via the communications module 118, to send and received transmissions 134 of data. The in-vehicle control system 102 may establish a wired communication link with the sensor module 132 using USB technology, IEEE 1394 technology, optical technology, other serial or parallel port technology, or any other suitable wired link. The communications module 118 may establish a wireless communication link 134 with the sensor module 132 using a Bluetooth communication protocol, an IEEE 802.11 protocol, an IEEE 802.16 protocol, a cellular signal, a Shared Wireless Access Protocol-Cord Access (SWAP-CA) protocol, a wireless USB protocol, or any other suitable wireless technology. The communications module 118 may receive data from the sensor module 132.

The sensor module 132 may include a proximity sensor, a radar system, a laser system, an ultrasonic sensor, electromagnetic sensors, and/or any other sensor module 132 for detecting the proximity of an object relative to the sensor module 132. For example, the sensor module 132 may be mounted in a bumper of the vehicle 100, near a tail light of the vehicle 100, in a rear hatch of the vehicle 100, in door of the vehicle 100, in a quarter panel of the vehicle 100, in an A pillar, in a B pillar, in a C pillar, etc. The sensor module 132 may be fixed or the sensor module 132 may be moveable, such as to rotate side to side and/or up and down.

FIG. 2 also depicts a remote device 150 that wirelessly communicates with the control system 102 via the communications module 118. The remote device 150 may include a smartphone, a tablet PC, an e-reader, a laptop computer, a desktop computer, a keyfob, and/or any other suitable device. The remote device 150 may establish a communications link with the control system 102 via the communications module 118 through the execution of an application on the remote device 150 and/or by accessing a web application using a browser executing on the remote device 150. As will be described in greater detail herein, the remote device 150 may receive data from the control system 102, such as video data and/or image data, and may transmit data, such as setting data, to the control system 102.

Figure 3:
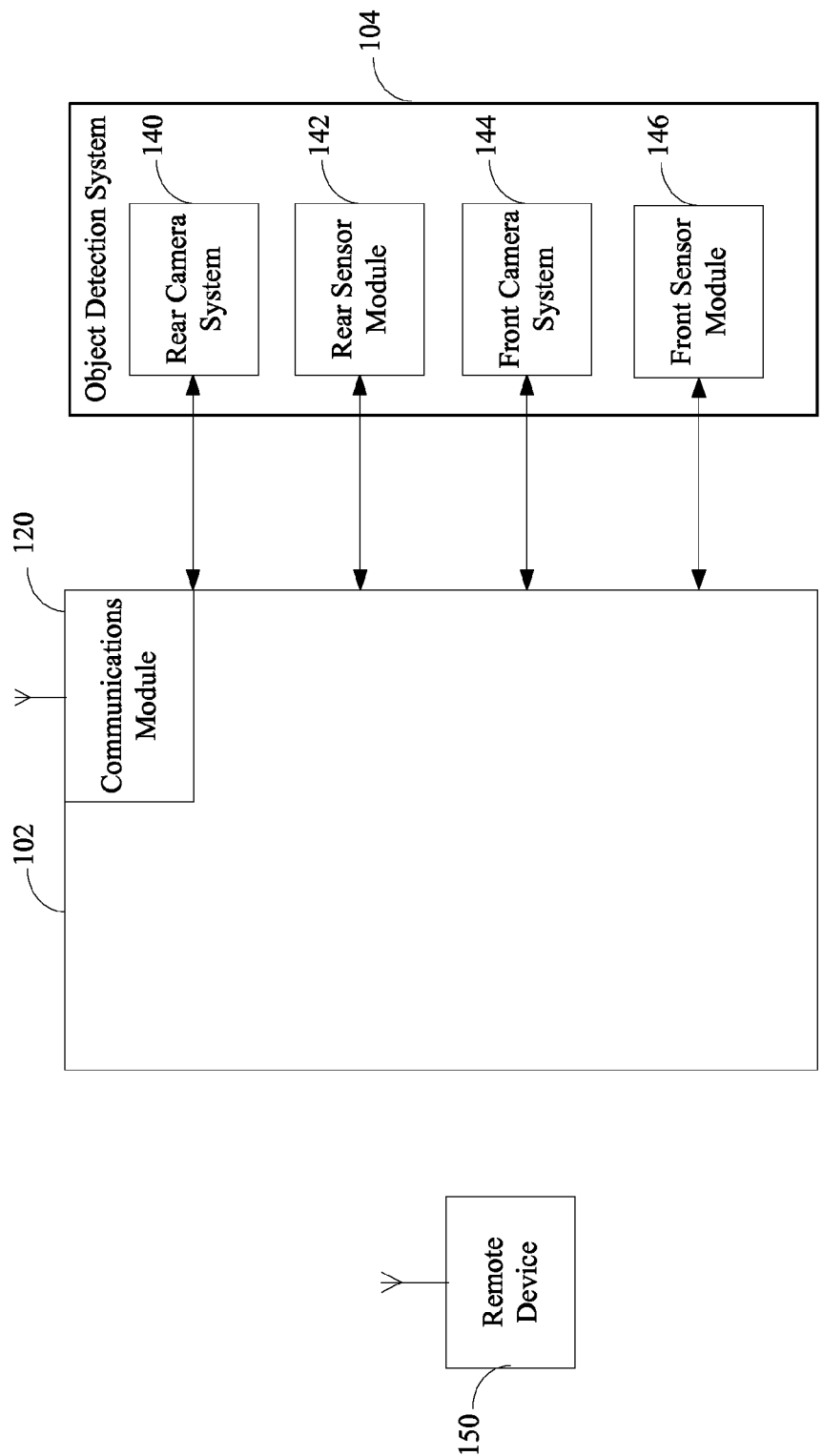
FIG. 3 is a block diagram of a control system with an object detection system having a front camera system, front sensor module, rear camera system, and rear sensor module.

FIG. 3 depicts a block diagram of a control system 102 with several of the elements of FIG. 2 removed for clarity. In the example shown in FIG. 3, the object detection system 104 includes multiple camera systems 140, 144 and sensor modules 142, 146. The camera systems 140, 144 and sensor modules 142, 146 may be configured in a similar manner to the camera system 130 and sensor module 132 of FIG. 1. In the example in FIG. 3, a rear camera system 140 and a rear sensor module 142 are configured for monitoring an area near a rear portion of the vehicle 100 and a front camera system 144 and a front sensor module 146 are configured for monitoring an area near a front portion of the vehicle 100.

Figure 4:
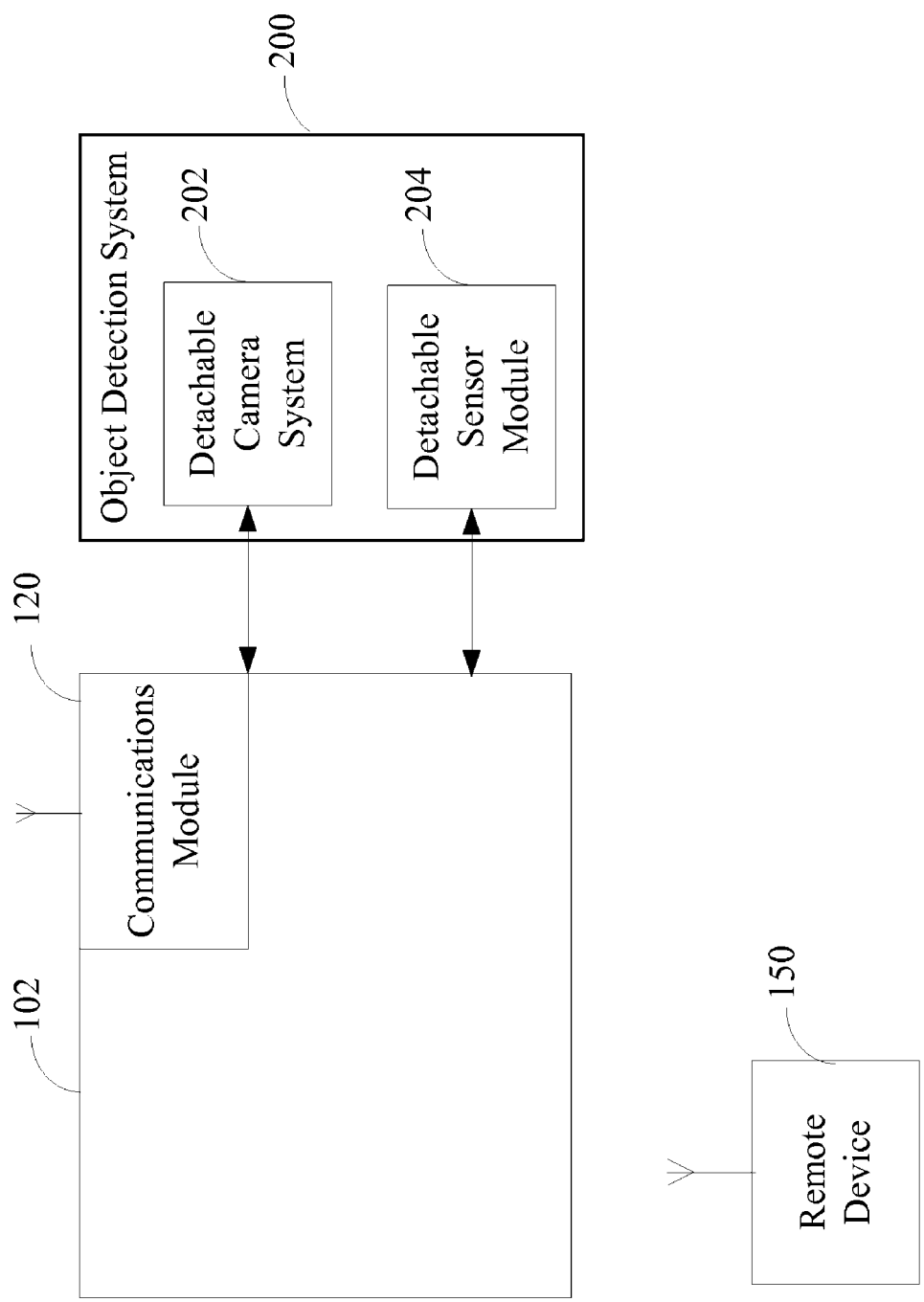
FIG. 4 is a block diagram of a control system with an object detection system having a detachable camera system and sensor module.

FIG. 4 depicts a block diagram of a control system 102 with a detachable or removable object detection system 200. The detachable object detection system 200 includes a detachable camera system 202 and a detachable sensor module 204. The detachable camera system 202 may include a camera with a suction cup to be mounted on an interior glass surface, such as the windshield or rear window. In other implementations, the detachable camera system 202 may include a camera and a Velcro® mount to attach to a portion of the overhead material, a portion of a cloth seat, or other portions of the interior of the vehicle 100. The detachable sensor module 204 may include an adhesive mount, a magnetic mount, or other suitable detachable mounting feature for the detachable sensor module 204 to mount to a portion of the exterior of the vehicle 100. In some implementations, the detachable object detection system 200 may include one of the detachable camera system 202 or the detachable sensor 204. In still other implementations, the sensor module 202 may instead be previously included with the vehicle 100, such as a vehicle 100 having an existing parking assist feature or other existing object detecting sensor system. The detachable camera system 202 may simply be mounted on the vehicle and communicatively coupled to the existing system of the vehicle, such as through an OBD II module, via a separately installed circuit, and/or wirelessly.

Figure 5:
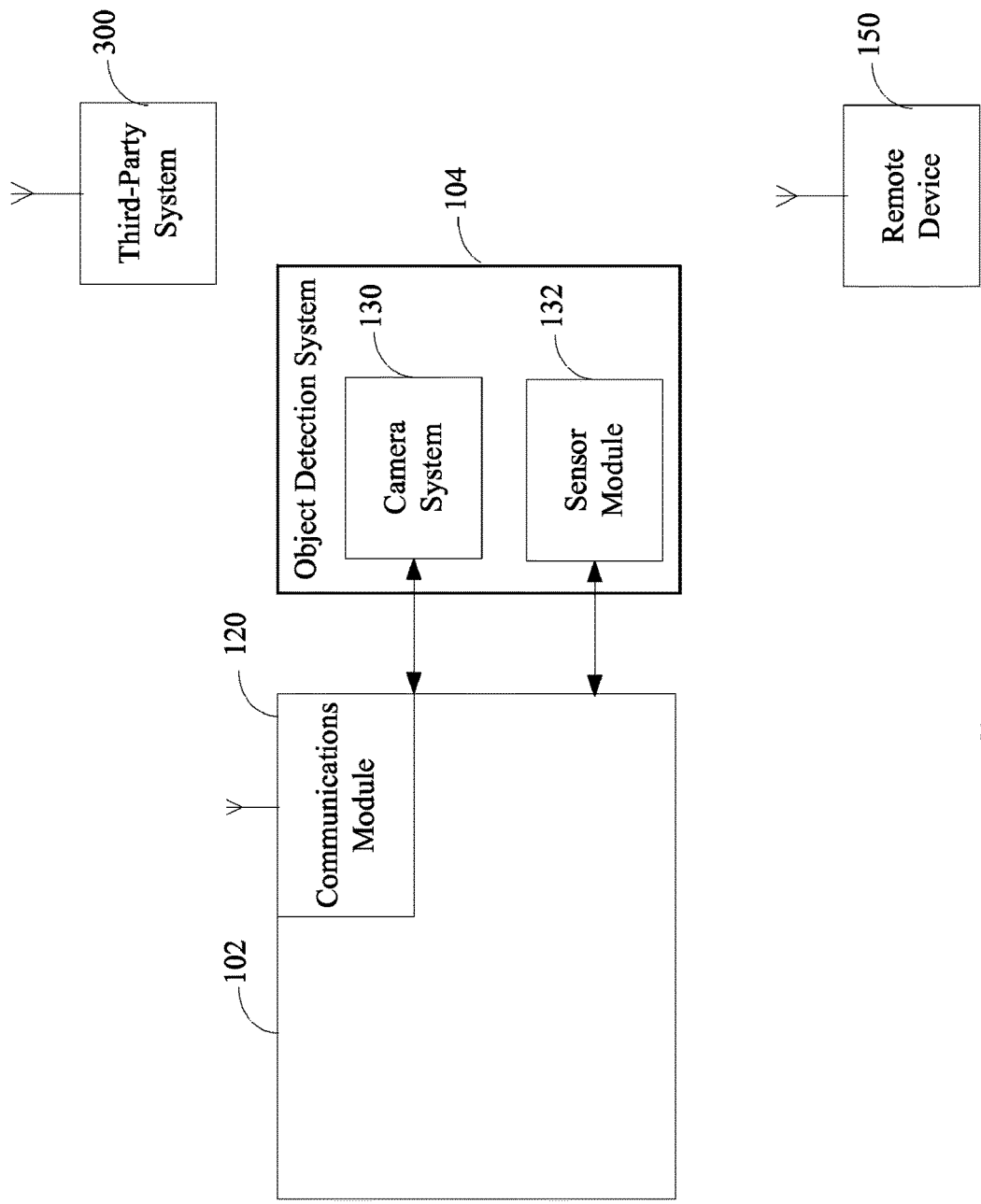
FIG. 5 is a block diagram of a control system showing a remote third-party system.

FIG. 5 depicts a block diagram of a control system 102 having a communications module 120 and depicting a third-party system 300. The third-party system 300 may be a system that is not affiliated with the remote device 150, the provider of the object detection system 104 and/or the vehicle 100. For example, a third-party system 300 may be a remote service that monitors data, such as textual data, video data, and/or image data, output from the control system 102 via the communications module 120 when an object is detected. The third-party system 300 may act as an initial filter to ignore detected objects that are unimportant (e.g., an animal, garbage, etc.) and only transmit the textual data, video data, and/or image data to the remote device 150 if the detected object is important (e.g., a person, a vehicle, etc.).

Figure 6A:
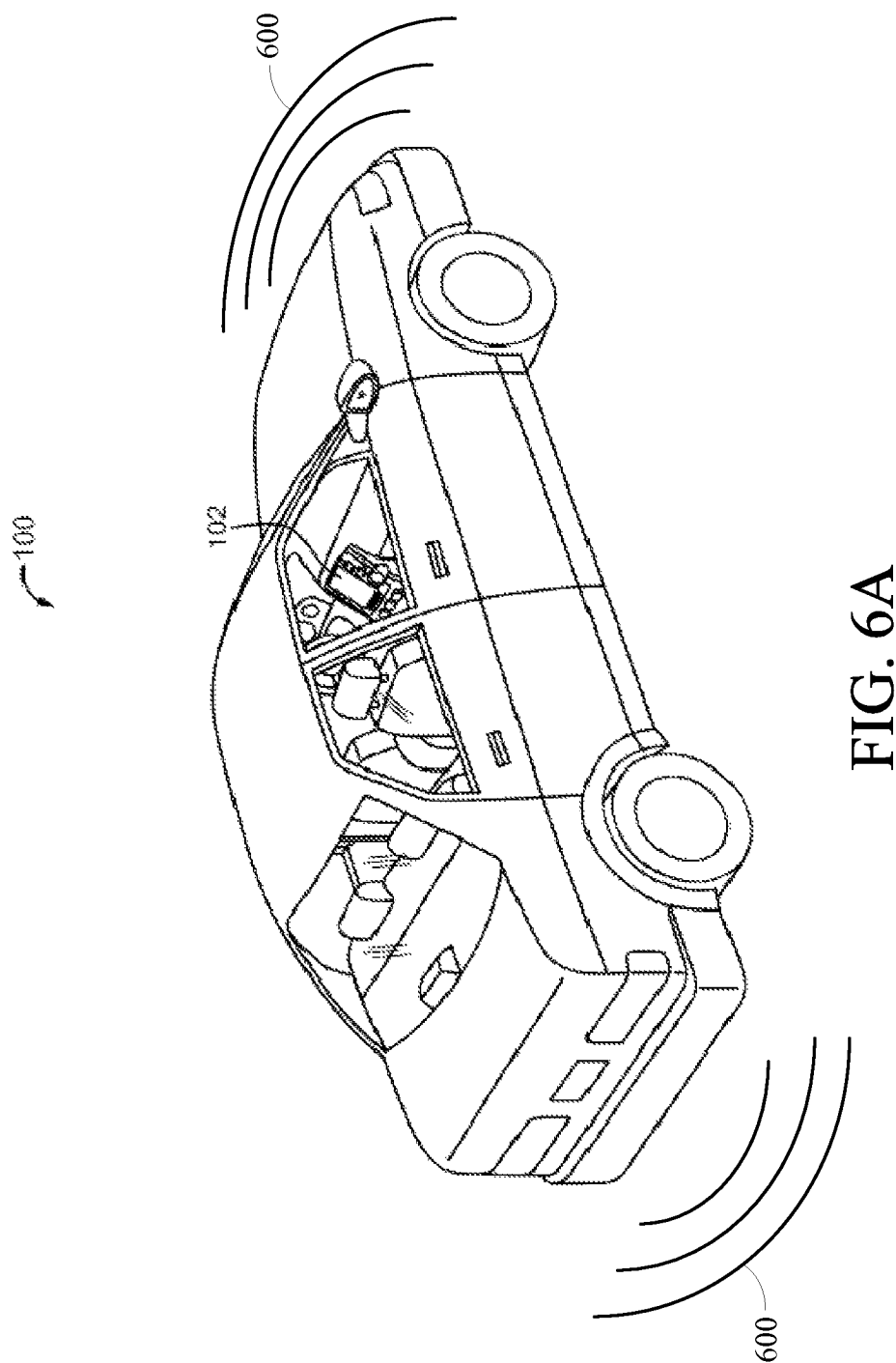
FIG. 6A is a drawing of a vehicle equipped with sensor modules to initially detect an area near the vehicle.

FIG. 6A depicts the vehicle 100 having the control system 102 and the object detection system (not shown). In the example shown, the object detection system includes a rear sensor module configured for monitoring an area near a rear portion of the vehicle 100 and a front sensor module configured for monitoring an area near a front portion of the vehicle 100. One or more camera systems may also be included as part of the object detection system. The vehicle 100 is not started and is shown in an initial or parked state. For example, the vehicle 100 shown in FIG. 6A may have just been turned off by a driver of the vehicle. The control system 102 is configured to calibrate the object detection system by determining an initial state of an area near the front and rear of the vehicle 100 at a first time. In some implementations, the calibration of the object detection system may occur when a transmission of the vehicle 100 is shifted into a park gear. In other implementations, the calibration of the object detection system may occur when an ignition of the vehicle 100 is turned off. In still other implementations, the calibration of the object detection system may occur in response to a user input (e.g., an activation of a button (such as a lock button), a voice command, or other user interface).

The calibration of the object detection system may activate a proximity sensor to determine the proximity of an object, such as a wall or other object, relative to the vehicle 100. If no object is present, the proximity sensor may indicate that no object is detected within the range of the proximity sensor. In another implementation, a radar system may be activated to detect the initial state of the area near the vehicle. In other implementations, a laser system may be activated to detect the initial state of the area near the vehicle. In still further implementations, an ultrasonic sensor or electromagnetic sensors may be activated to detect the initial state of the area near the vehicle. The sensor module shown in the present example is a radar system that emits radio waves 600 to detect the presence of objects near the front and rear of the vehicle 100. The initial state detected during the calibration of the object detection system at the first time may be used to compare a second state at a second time, after the first time, to determine any differences between the initial or first state and the second state. Data indicative of the initial state of the area near the vehicle may be stored in a storage device, such as storage device 110, non-volatile memory 112, and/or volatile memory 114.

Figure 6B:
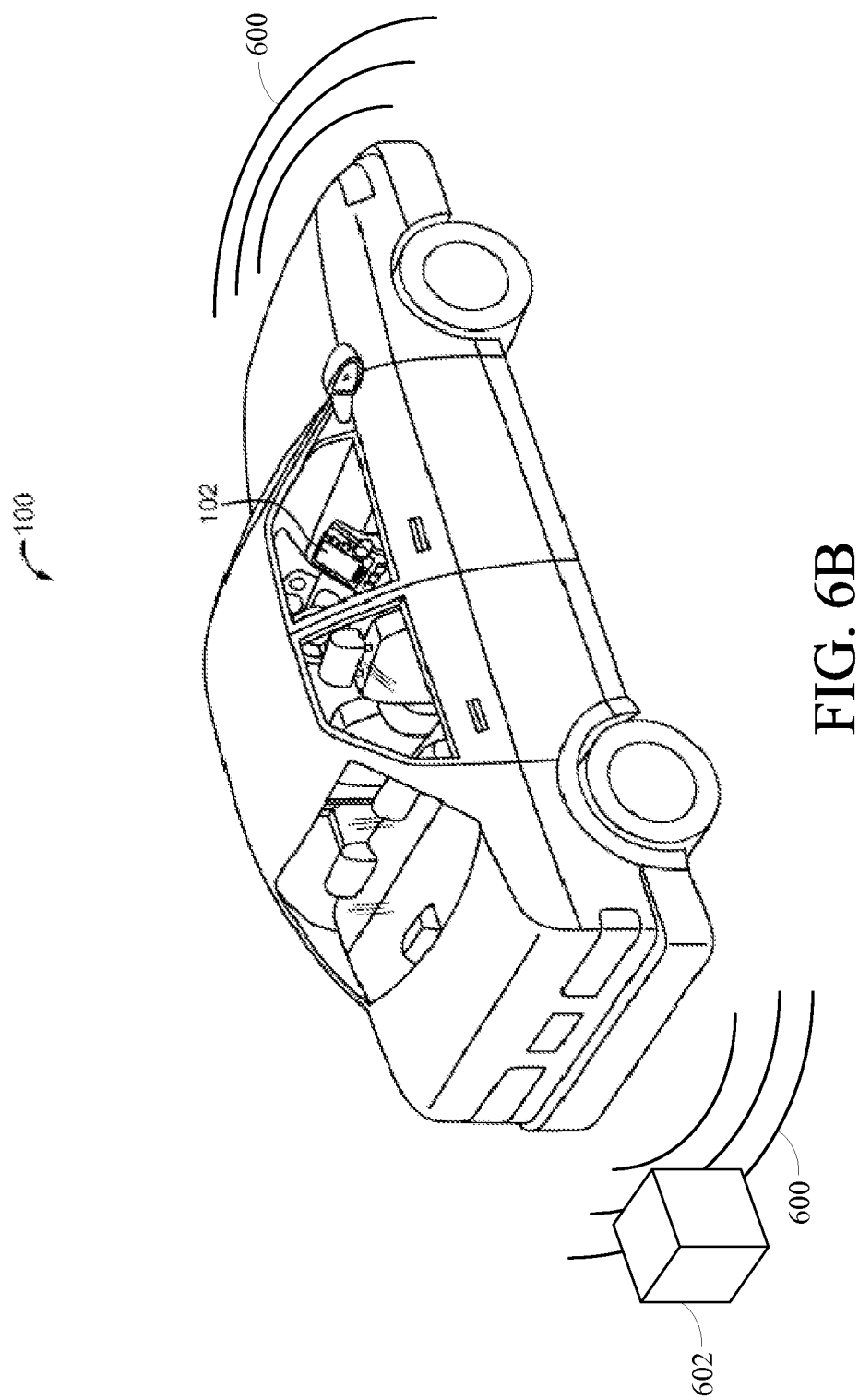
FIG. 6B is a drawing of the vehicle of FIG. 6A detecting the presence of an object.

FIG. 6B depicts the vehicle 100 with the object detection system and showing an object 602 located within the area near a rear portion of the vehicle 100. In some implementations, when the object detection system detects the presence of the object 602 in the area near the rear portion of the vehicle 100, a response may be activated. The response may include the activation of a camera system such that the object 602 may be recorded, such as by saving a video file in a computer-readable storage device. In other implementations, a photo may be taken by the camera system and stored in a computer-readable storage device. The camera system may be an exterior camera system, an interior camera system, and/or a combination thereof In some implementations, the camera system may include a rotatable camera or a fisheye camera to take a 360 degree view of the surroundings of the vehicle 100.

In some implementations, the video file and/or photo may be transmitted to a remote device, such as a smartphone, keyfob, or a third-party monitoring system or service, using a communications module of the control system 102 (such as by using a wireless connection). In still further instances, a notification, such as a text message, may be output by the communications module of the control module 102 to the remote device, such as the smartphone, keyfob, or third-party monitoring system or service. Further still, the response may include the activation of an alarm, activation of a lighting system, activation of a sound system, etc. In some implementations, combinations of the foregoing responses may occur together, such as activating a lighting system of the vehicle 100 and the camera system such that the lighting system lights up the area to be recorded by the camera system. Such a combination may be useful when lighting is low, such as in a parking garage or at night.

In some implementations, the response may not be activated until another event occurs. For example, the event may be when the vehicle 100 receives an unlock command, such as from a keyfob. The object detection system may determine a second state of the area near the rear of the vehicle 100 at this second time. The object detection system may then detect the presence of the object 602 by comparing the data indicative of the initial or first state of the area near the vehicle 100 to the data indicative of the second state of the area near the vehicle 100. The detection of the object 602 may cause a response to be activated at this second time. The response may include the activation of a camera system such that the object 602 may be recorded, such as by saving a video file in a computer-readable storage device and/or streaming the recording of the object 602 to a remote device, such as a smartphone, keyfob, and/or third-party monitoring system or service. In other implementations, a photo may be taken by the camera system and stored in a computer-readable storage device and/or transmitted to the remote device, such as a smartphone, keyfob, and/or third-party monitoring system or service. In still further instances, a notification, such as a text message, may be output by the communications module of the control module 102 to the remote device, such as the smartphone, keyfob, and/or third-party monitoring system or service. Further still, the response may include the activation of an alarm, activation of a lighting system, activation of a sound system, etc. In some implementations, combinations of the foregoing responses may occur together, such as activating a lighting system of the vehicle 100 and the camera system such that the lighting system lights up the area to be recorded by the camera system. Such a combination may be useful when lighting is low, such as in a parking garage or at night.

In some implementations, the response may be activated in response to detections by other sensors either in addition to or in lieu of the object detection system. For example, a motion sensor in the interior of the vehicle 100 may activate the response based on motion inside the vehicle 100. A vibration detection sensor may be used to detect the breakage of glass and/or a disturbance of the vehicle 100 (e.g., a person hitting the vehicle 100). A tilt sensor may be used to detect a tilt of the vehicle 100.

In some implementations, the event may be a proximity of a remote device to the vehicle 100, such as a proximity of the keyfob or smartphone to the vehicle 100 to cause the object detection system to determine the second state of the area near the vehicle 100. In some implementations, a remote device may be used to remotely activate and/or access the camera system of the vehicle 100 such that a user may remotely monitor the vehicle (e.g., through a web interface, through an application executing on a mobile phone, through a keyfob, etc.). For example, a user may open a video channel to the camera system of the vehicle 100 to monitor the exterior and/or interior of the vehicle when the user desires.

Figure 7A:
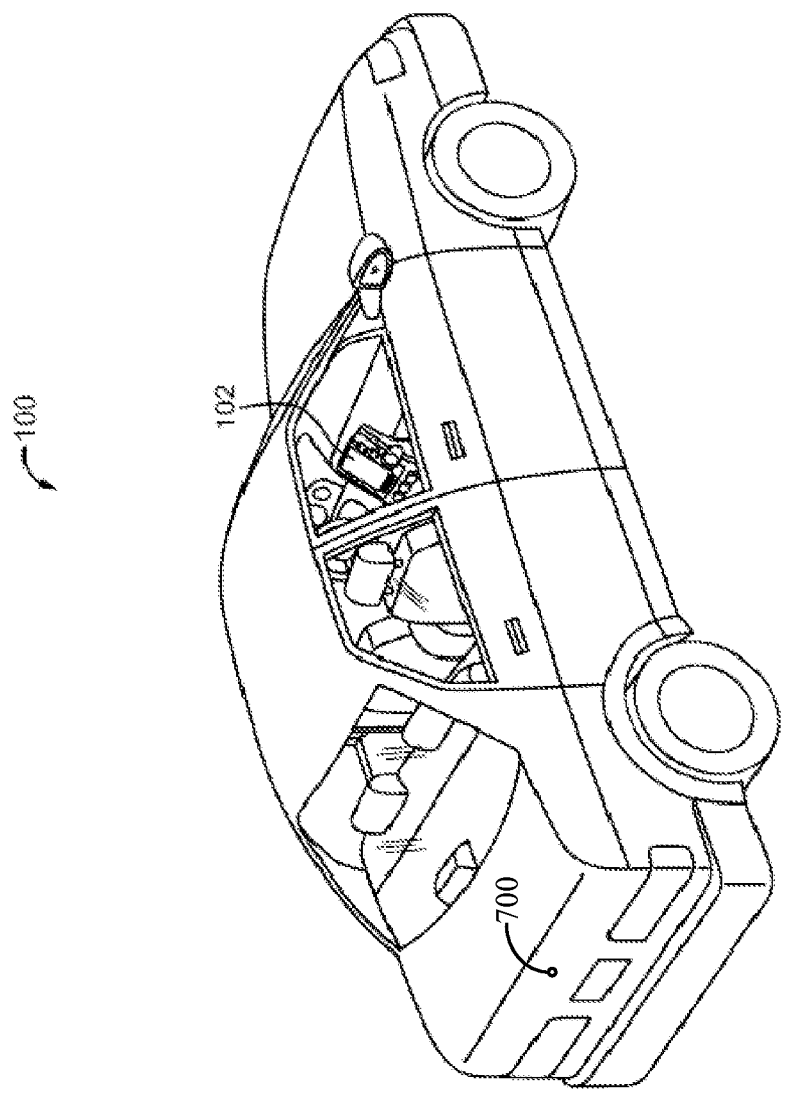
FIG. 7A is a drawing of a vehicle equipped with a camera to initially detect an area near the vehicle.

FIG. 7A depicts vehicle 100 having the control system 102 and the object detection system (not shown). In the example shown, the object detection system includes a camera system 700 configured for monitoring an area near a rear portion of the vehicle 100. The vehicle 100 is not started and is shown in an initial or parked state. For example, the vehicle 100 shown in FIG. 7A may have just been turned off by a driver of the vehicle. The control system 102 is configured to calibrate the object detection system by determining an initial state of an area near the front and rear of the vehicle 100 at a first time by using the camera system 700. In some implementations, the calibration of the object detection system may occur when a transmission of the vehicle 100 is shifted into a park gear. In other implementations, the calibration of the object detection system may occur when an ignition of the vehicle 100 is turned off. In still other implementations, the calibration of the object detection system may occur in response to a user input (e.g., an activation of a button (such as a lock button), a voice command, or other user interface).

The calibration of the object detection system of the present example uses the camera system 700 to take a picture of the area near the vehicle that may be used as an initial state. Data indicative of the initial state of the area near the vehicle may be stored in a storage device, such as storage device 110, non-volatile memory 112, and/or volatile memory 114. The initial state determined during the calibration of the object detection system at the first time may be used to compare a second state at a second time, after the first time, to determine any differences between the initial or first state and the second state.

Figure 7B:
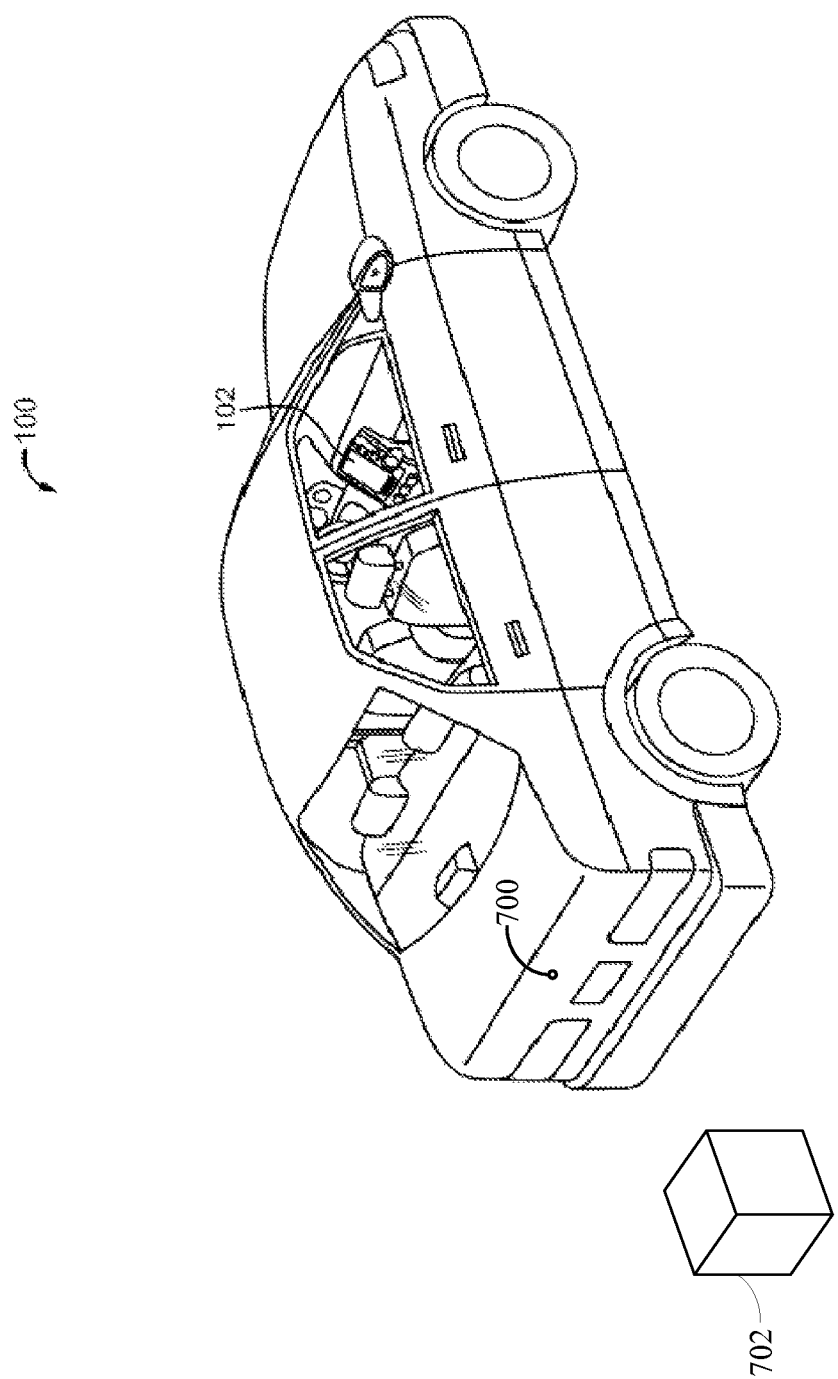
FIG. 7B is a drawing of the vehicle of FIG. 7A detecting the presence of an object.

FIG. 7B depicts the vehicle 100 with the object detection system and showing an object 702 located within the area near a rear portion of the vehicle 100. In some implementations, when the object detection system determines the presence of the object 702 in the area near the rear portion of the vehicle 100, a response may be activated when the presence of the object 702 is determined. The determination that the object 702 is present may occur through the use of object recognition and the output from the camera system 700. That is, data indicative of a photo taken by the camera system 700 may be compared to the data indicative of the initial state to determine the presence or absence of anomalous objects. If an anomalous object is detected, then the control system 102 may determine that the object 702 is detected.

The response may include the activation of the camera system 700 such that the object 702 may be recorded, such as by saving a video file in a computer-readable storage device. In other implementations, a photo may be taken by the camera system 700 and stored in a computer-readable storage device. The camera system 700 may be an exterior camera system, an interior camera system, and/or a combination thereof. In some implementations, the camera system may include a rotatable camera or a fisheye camera to take a 360 degree view of the surroundings of the vehicle 100.

In some implementations, the video file and/or photo may be transmitted to a remote device, such as a smartphone, keyfob, or a third-party monitoring system or service, using a communications module of the control system 102 (such as by using a wireless connection). In still further instances, a notification, such as a text message, may be output by the communications module of the control system 102 to the remote device, such as the smartphone, keyfob, or third-party monitoring system or service. Further still, the response may include the activation of an alarm, activation of a lighting system, activation of a sound system, etc. In some implementations, combinations of the foregoing responses may occur together, such as activating a lighting system of the vehicle 100 and the camera system 700 such that the lighting system lights up the area to be recorded by the camera system 700. Such a combination may be useful when lighting is low, such as in a parking garage or at night.

In some implementations, the response may not be activated until another event occurs. For example, the event may be when the vehicle 100 receives an unlock command, such as from a keyfob. The object detection system may determine a second state of the area near the rear of the vehicle 100 at this second time using the camera system 700. The object detection system may then determine the presence of the object 702 by comparing the data indicative of the initial or first state of the area near the vehicle 100 to the data indicative of the second state of the area near the vehicle 100. The determination of the presence of the object 702 may cause a response to be activated at this second time. The response may include the activation of the camera system 700 such that the object 702 may be recorded, such as by saving a video file in a computer-readable storage device and/or streaming the recording of the object 702 to a remote device, such as a smartphone, keyfob, and/or third-party monitoring system or service. In other implementations, a photo may be taken by the camera system 700 and stored in a computer-readable storage device and/or transmitted to the remote device, such as a smartphone, keyfob, and/or third-party monitoring system or service. In still further instances, a notification, such as a text message, may be output by the communications module of the control module 102 to the remote device, such as the smartphone, keyfob, and/or third-party monitoring system or service. Further still, the response may include the activation of an alarm, activation of a lighting system, activation of a sound system, etc. In some implementations, combinations of the foregoing responses may occur together, such as activating a lighting system of the vehicle 100 and the camera system 700 such that the lighting system lights up the area to be recorded by the camera system 700. Such a combination may be useful when lighting is low, such as in a parking garage or at night.

In some implementations, the response may be activated in response to detections by other sensors either in addition to or in lieu of the camera system 700. For example, a motion sensor in the interior of the vehicle 100 may activate the response based on motion inside the vehicle 100. A vibration detection sensor may be used to detect the breakage of glass and/or a disturbance of the vehicle 100 (e.g., a person hitting the vehicle 100). A tilt sensor may be used to detect a tilt of the vehicle 100.

In some implementations, the event may be a proximity of a remote device to the vehicle 100, such as a proximity of the keyfob or smartphone to the vehicle 100 to cause the object detection system to determine the second state of the area near the vehicle 100 using the camera system 700. In some implementations, a remote device may be used to remotely activate and/or access the camera system 700 of the vehicle 100 such that a user may remotely monitor the vehicle (e.g., through a web interface, through an application executing on a mobile phone, through a keyfob, etc.). For example, a user may open a video channel to the camera system 700 of the vehicle 100 to monitor the exterior and/or interior of the vehicle when the user desires.

FIG. 8 depicts an example process 800 for activating a sensor module using a control system and activating a response when a change in an area near a vehicle is detected. The process 800 includes activating a sensor module (block 802). The sensor module may include a proximity sensor, a radar system, a laser system, an ultrasonic sensor, electromagnetic sensors, and/or any other sensor module for detecting the proximity of an object relative to the sensor module. The sensor module may be activated at a first time. The first time may occur when a transmission of the vehicle is shifted into a park gear. In other implementations, the first time may occur when an ignition of the vehicle is turned off. In still other implementations, the first time may occur in response to a user input (e.g., an activation of a button (such as a lock button), a voice command, or other user interface).

An initial state for an area near the vehicle may be detected (block 804). The initial state for the area near the vehicle is detected using the sensor module. Data indicative of the initial state of the area near the vehicle may be stored in a storage device, such as storage device 110, non-volatile memory 112, and/or volatile memory 114.

A change in the area near the vehicle may be determined (block 806) based, at least in part, on the initial state. For example, a second state for the area near the vehicle may be detected using the sensor module. In some implementations, the second state may be determined when an object enters the area. In other implementations, the second state may be determined at a later time and/or in response to an event, such as a command to unlock the vehicle, a proximity of a keyfob to the vehicle, and/or another time or event.

A response is activated (block 808) based, at least in part, on the determined change in the area near the vehicle. The response may include recording video or taking a photo with a camera system. The video file and/or photo may be transmitted to a remote device, such as a smartphone, keyfob, or a third-party monitoring system or service, using a communications module of the control system. In some instances, the response may include a notification, such as a text message, that may be outputted by the communications module of the control system to the remote device, such as the smartphone, keyfob, or third-party monitoring system or service. The response may also include the activation of an alarm, activation of a lighting system, activation of a sound system, etc. In some implementations, combinations of the foregoing responses may occur together, such as activating a lighting system of the vehicle and the camera system such that the lighting system lights up the area to be recorded by the camera system.

FIG. 9 depicts an example process 900 for activating a camera system using the control system and activating a response when a change in an area near a vehicle is detected. The process 900 includes activating a camera system (block 902). The camera system may be activated at a first time. The first time may occur when a transmission of the vehicle is shifted into a park gear. In other implementations, the first time may occur when an ignition of the vehicle is turned off. In still other implementations, the first time may occur in response to a user input (e.g., an activation of a button (such as a lock button), a voice command, or other user interface).

An initial state for an area near the vehicle may be determined (block 904). The initial state for the area near the vehicle may be determined when the camera system is activated at a first time to take a picture of the area near the vehicle. Data indicative of the initial state of the area near the vehicle may be stored in a storage device, such as storage device 110, non-volatile memory 112, and/or volatile memory 114.

A change in the area near the vehicle may be determined (block 906) based, at least in part, on the initial state. For example, the camera may be used at a second time to take a picture of the area near the vehicle to be compared to the data indicative of the initial state. The determination of a change in the area may occur through the use of object recognition and the output from the camera system. That is, data indicative of a photo taken by the camera system may be compared to the data indicative of the initial state to determine the presence or absence of anomalous objects. If an anomalous object is detected, then the control system may determine that a change in the area has occurred. In some implementations, the second state may be determined when an object enters the area. In other implementations, the second state may be determined at a later time and/or in response to an event, such as a command to unlock the vehicle, a proximity of a keyfob to the vehicle, and/or another time or event.

A response is activated (block 908) based, at least in part, on the determined change in the area near the vehicle. The response may include recording video or taking a photo with a camera system. The video file and/or photo may be transmitted to a remote device, such as a smartphone, keyfob, or a third-party monitoring system or service, using a communications module of the control system. In some instances, the response may include a notification, such as a text message, that may be outputted by the communications module of the control system to the remote device, such as the smartphone, keyfob, or third-party monitoring system or service. The response may also include the activation of an alarm, activation of a lighting system, activation of a sound system, etc. In some implementations, combinations of the foregoing responses may occur together, such as activating a lighting system of the vehicle and the camera system such that the lighting system lights up the area to be recorded by the camera system.

FIG. 10 depicts a process 1000 for establishing a communications link with a remote device and activating a camera system. The control system of the vehicle may establish a communications link with a remote device (block 1002). The communications link with the remote device may be established using a communications module of the control system. The communications module may be used to connect to the remote device via a wireless connection (e.g., a Bluetooth® connection, an IEEE 802.11 protocol connection, an IEEE 802.16 protocol connection, a cellular connection, and/or through another connection). In some implementations, the remote device may be a computing device, such as a laptop, desktop, tablet, smartphone, smart television, etc. In other implementations, the remote device may be a third-party remote service or system. In some implementations, the communications link may be established by the remote device requesting a remote connection with the control system of the vehicle. The request to connect with the control system of the vehicle may be facilitated through a web interface. In some implementations, the communications link may include security features, such as a login and password. Once the communications link is established with the remote device, a camera system of the vehicle may be activated (block 1004). In some implementations, video output from the camera system may be streamed to the remote device. In other implementations, one or more photos may be taken by the camera system and transmitted to the remote device. In still other implementations, a reduced frame rate or series of photos may be taken and transmitted to the remote device. In some implementations, a user interface may be provided for a user of the remote device to cause the camera system to take one or more photos, start or stop video streaming, modify the frame rate of the transmitted output of the camera system, and/or interact with one or more other systems of the vehicle (e.g., activate one or more other sensors, play audio through the sound system, activate an alarm, etc.).

Figure 11:
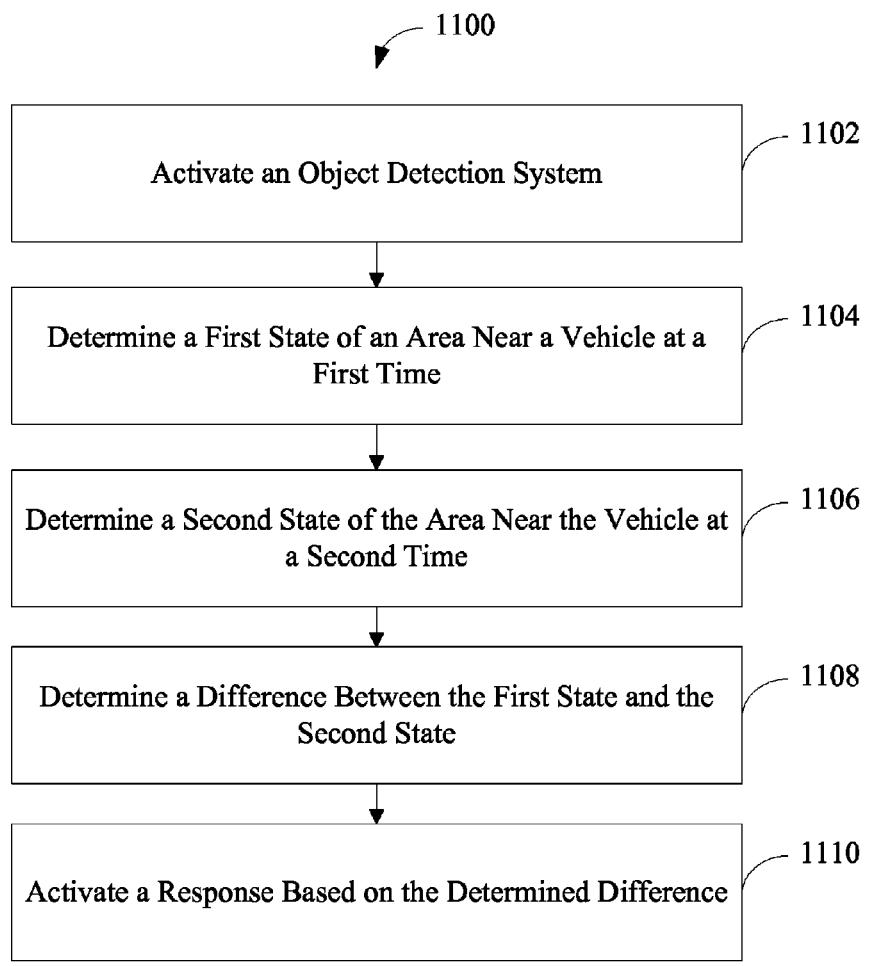
FIG. 11 illustrates a process for activating a camera system using the control system based on a sensor module detecting a change in an area near a vehicle.

FIG. 11 depicts an example process 1100 for activating a response based on a difference between a first state of an area near a vehicle and a second state of the area near the vehicle. The process 1100 includes activating an object detection system (block 1102). The object detection system may include one or more sensor modules, one or more camera systems, and/or a combination thereof. The one or more sensor modules may include a proximity sensor, a radar system, a laser system, an ultrasonic sensor, electromagnetic sensors, and/or any other sensor module for detecting the proximity of an object relative to the sensor module. The one or more sensor modules and/or camera system may be positioned at any location of the vehicle. In one example, a front camera system, a front sensor module, a rear camera system, and a rear sensor module may be used. The sensor module and/or the camera system may be activated at a first time. The first time may occur when a transmission of the vehicle is shifted into a park gear. In other implementations, the first time may occur when an ignition of the vehicle is turned off. In still other implementations, the first time may occur in response to a user input (e.g., an activation of a button (such as a lock button), a voice command, or other user interface).

A determination of a first state for an area near the vehicle at a first time may be determined (block 1104). In some implementations, the first state for the area near the vehicle may be detected by the one or more sensor modules. The data indicative of the first state of the area near the vehicle may be stored in a storage device, such as storage device 110, non-volatile memory 112, and/or volatile memory 114. In some implementations, the one or more camera systems may also be used in addition to or in lieu of the one or more sensor modules for determining the first state of the area near the vehicle at the first time.

A determination of a second state for the area near the vehicle at a second time may be determined (block 1106). In some implementations, the second state for the area near the vehicle may be detected by the one or more sensor modules. In some implementations, the one or more camera systems may also be used in addition to or in lieu of the one or more sensor modules for determining the second state of the area near the vehicle at the second time. The second time may occur at a later time than the first time.

A difference between the first state and the second state may be determined (block 1108). In some implementations, data indicative of the second state from the one or more sensor modules may be compared to the data indicative of the first state stored in the storage device to determine any differences in the area near the vehicle between the first state and the second state. In addition to, or in lieu of, the comparison between the data indicative of the first state from the one or more sensor modules and the data indicative of the second state from the one or more sensor modules, differences between the first state and the second state may be determined using object recognition and the output from the camera system. That is, data indicative of a photo taken by the camera system for the first state may be compared to the data indicative of a photo taken by the camera system for the second state to determine any differences.

A response may be activated based, at least in part, on the determined difference (block 1110). The response may include recording video or taking a photo with the camera system. The video file and/or photo may be transmitted to a remote device, such as a smartphone, keyfob, or a third-party monitoring system or service, using a communications module of a control system of the vehicle. In some instances, the response may include a notification, such as a text message, that may be outputted by the communications module of the control system of the vehicle to the remote device, such as the smartphone, keyfob, or third-party monitoring system or service. In some implementations, other data may be transmitted to the remote device, such as diagnostic information for a previous predetermined period of time, such as the prior twenty seconds. The response may also include the activation of an alarm, activation of a lighting system, activation of a sound system, outputting of text-to-speech audio, etc. In some implementations, combinations of the foregoing responses may occur together, such as activating a lighting system of the vehicle and the camera system such that the lighting system lights up the area to be recorded by the camera system.

The response may be activated upon the determination of the difference or may occur at a later time or based upon the occurrence of another event. For example, a response of activating a camera system may occur when a difference between the first state and a second, later state is determined. The output from the camera system may be recorded in a storage device of the vehicle. In some implementations, five seconds of video may be recorded each time a difference is detected. In other implementations, ten seconds, fifteen seconds, twenty seconds, thirty seconds, sixty seconds, and/or any other time period for the recording of video from the camera system may be used. In some implementations, the recorded video in the storage device may be temporarily stored and deleted after a predetermined period of time to maintain storage space on the storage device.

In some implementations, optical character recognition and/or object recognition may be used to determine one or more characters in a photo output by the camera system and/or one or more objects in a photo output by the camera system. For example, optical character recognition may be used to determine one or more license plate characters or numbers. The license plate characters or numbers may be textually stored in a data file such that a user of the vehicle may retrieve the license plate characters or values at a later time, such as if a vehicle parked behind the user's vehicle hits the user's vehicle and leaves. In other implementations, object recognition may be employed to determine objects in the vicinity of the vehicle. For example, object recognition may identify an innocuous object, such as a plastic cup, near the vehicle and may not activate a response. Thus, object recognition may be used to filter detected objects that are unimportant (e.g., an animal, garbage, etc.) and only activate a response, such as transmitting textual data, video data, and/or image data to a remote device, if the detected object is important (e.g., a person, a vehicle, etc.).

In some implementations, the camera system may take a panoramic picture of an initial state around the vehicle when the vehicle is initially parked and/or locked. The panoramic picture may be stored in the storage device such that a user may retrieve the panoramic picture if an incident occurs involving the vehicle.

Of course other implementations and uses for the sensor modules and/or camera systems for the in-vehicle camera and alert systems may be used.

It should be noted that references to "front," "back," "rear," "upward," "downward," "inner," "outer," "interior," "exterior," "right," and "left" in this description are merely used to identify the various elements as they are oriented in the FIGS. These terms are not meant to limit the element which they describe, as the various elements may be oriented differently in various applications.

It should further be noted that for purposes of this disclosure, the term "coupled" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for a vehicle comprising:
   an object detection system associated with a vehicle, wherein the object detection system is configured to detect a presence of an object near the vehicle when the vehicle is not started; and
   a control system communicatively coupled to the object detection system, wherein the control system is configured to:
      responsive to the vehicle being shifted into park or being turned off, calibrate the object detection system by determining an initial state of an area near the vehicle at a first time using the object detection system;
      determine a second state of the area near the vehicle at a second time using the object detection system;
      determine a difference between the second state and the first state; and
      activate a response if the object detection system detects the presence of an object near the vehicle based, at least in part, on the determined difference.

2. The system of claim 1, wherein the object detection system comprises a sensor module.

3. The system of claim 2, wherein the sensor module comprises a proximity sensor.

4. The system of claim 2, wherein the sensor module comprises radar.

5. The system of claim 2, further comprising a camera system, wherein the control system is communicatively coupled to the camera system.

6. The system of claim 5, wherein the response activated by the control system is an activation of the camera system.

7. The system of claim 6, wherein the control system comprises a storage device, wherein the control system is configured to store video data received from the camera system in the storage device.

8. The system of claim 6, wherein the control system comprises a communications module, wherein the control system is configured to transmit video data received from the camera system to a remote device via the communications module.

9. The system of claim 1, wherein the control system comprises a communications module, wherein the response activated by the control system is a transmission of a notification to a remote device via the communications module.

10. The system of claim 1, wherein the control system comprises a communications module, wherein the control system is configured to communicate with a third-party party system, and wherein the response activated by the control system is a transmission to the third-party system.

11. The system of claim 1, wherein the control system comprises a user interface, wherein the object detection system and the response are configurable via the user interface.

12. A method for activating a response based on a detection of an object near a vehicle, the method comprising:
   responsive to the vehicle being shifted into park or being turned off, using a control system of a vehicle to calibrate an object detection system by determining a first state of an area near the vehicle at a first time;
   determining, using the control system of the vehicle, a second state of the area near the vehicle at a second time using the object detection system, wherein the second time is after the first time;
   determining, using the control system of the vehicle, a difference between the second state and the first state; and
   activating, using the control system of the vehicle, a response based, at least in part, on the determined difference.

13. The method of claim 12, wherein the first time occurs when the vehicle is turned off.

14. The method of claim 13, wherein the second time occurs when the vehicle is unlocked.

15. The method of claim 12, wherein the object detection system comprises a camera system.

16. The method of claim 15, wherein the response is an activation of the camera system.

17. The method of claim 12, wherein the response is a text message notification sent to a remote device.

18. A system for a vehicle comprising:
an object detection system associated with a vehicle, the object detection system comprising:
a sensor module configured to detect a presence of an object near the vehicle, and
a camera system; and
a control system communicatively coupled to the sensor module and the camera system, wherein the control system is configured to:
responsive to the vehicle being shifted into park or being turned off, calibrate the object detection system by determining an initial state of an area near the vehicle at a first time using the sensor module;
determine a second state of the area near the vehicle at a second time using the sensor module;
determine a difference between the second state and the first state; and
activate the camera system if the sensor module detects the presence of an object near the vehicle based, at least in part, on the determined difference.

19. The system of claim 18, further comprising a communications module, wherein the control system is configured to activate the camera system in response to a request from a remote device.

20. The system of claim 18, further comprising a storage device, wherein the control system is configured to store video data received from the camera system in the storage device.

* * * * *